(12) United States Patent
Zhang et al.

(10) Patent No.: US 10,983,522 B2
(45) Date of Patent: Apr. 20, 2021

(54) EMERGENCY STOP SPEED PROFILE FOR AUTONOMOUS VEHICLES

(71) Applicant: Baidu USA LLC, Sunnyvale, CA (US)

(72) Inventors: Liangliang Zhang, Sunnyvale, CA (US); Dong Li, Sunnyvale, CA (US); Yifei Jiang, Sunnyvale, CA (US); Jiaming Tao, Sunnyvale, CA (US); Fan Zhu, Sunnyvale, CA (US); Jiangtao Hu, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 283 days.

(21) Appl. No.: 15/917,556

(22) Filed: Mar. 9, 2018

(65) Prior Publication Data
US 2019/0278276 A1 Sep. 12, 2019

(51) Int. Cl.
*G05D 1/02* (2020.01)
*G05D 1/00* (2006.01)
*B60W 10/20* (2006.01)
*B60W 10/18* (2012.01)
*B60W 30/09* (2012.01)
*H04L 29/08* (2006.01)

(52) U.S. Cl.
CPC ........... *G05D 1/0214* (2013.01); *B60W 10/18* (2013.01); *B60W 10/20* (2013.01); *B60W 30/09* (2013.01); *G05D 1/0088* (2013.01); *G05D 1/027* (2013.01); *G05D 1/0221* (2013.01); *G05D 1/0246* (2013.01); *G05D 1/0257* (2013.01); *G05D 1/0278* (2013.01); *B60W 2510/18* (2013.01); *B60W 2510/20* (2013.01); *H04L 67/12* (2013.01)

(58) Field of Classification Search
CPC combination set(s) only.
See application file for complete search history.

(56) References Cited

U.S. PATENT DOCUMENTS

2017/0059716 A1* 3/2017 Choi .................. G01C 21/00
2017/0277195 A1* 9/2017 Frazzoli ............ B60W 30/0956
(Continued)

OTHER PUBLICATIONS

Gareth Loy, The Mathematical Foundations of Music, 2011, MIT Press (Year: 2011).*
(Continued)

*Primary Examiner* — Navid Ziaeianmehdizadeh
(74) *Attorney, Agent, or Firm* — Womble Bond Dickinson (US) LLP

(57) ABSTRACT

According to some embodiments, a system performs an emergency stop when a speed planning optimization fails to generate a speed curve. In one embodiment, in response to an emergency stop request, the system generates one or more path-time analytical curves, where each of the one or more path-time curves is represented by a polynomial function. The system selects one of the path-time analytical curves to determine whether the selected path-time analytical curve satisfies a set of evaluation criteria. If the selected path-time analytical curve does not satisfy the set of evaluation criteria, the system selects a next one of the path-time analytical curves for evaluation. If the selected path-time analytical curve satisfies the set of evaluation criteria, the system generates a trajectory based on the selected path-time analytical curve to control the ADV during an emergency stop.

21 Claims, 11 Drawing Sheets

(56) References Cited

U.S. PATENT DOCUMENTS

2018/0259967 A1* 9/2018 Frazzoli ................ G08G 1/166
2019/0072973 A1* 3/2019 Sun ...................... G05D 1/0221

OTHER PUBLICATIONS

The Physics of hypertextbook—edited on Oct. 15, 2017—https://physics.info/motion-equations/—https://web.archive.org/web/20171015033815/https://physics.info/motion-equations/ (Year: 2017).*
https://www.tu-chemnitz.de/informatik//KI/edu/robotik/ws2016/lecture-tg%20l.pdf (Year: 2017).*

* cited by examiner

US 10,983,522 B2

EMERGENCY STOP SPEED PROFILE FOR AUTONOMOUS VEHICLES

TECHNICAL FIELD

Embodiments of the present disclosure relate generally to operating autonomous vehicles. More particularly, embodiments of the disclosure relate to emergency stop speed profiles for autonomous driving vehicles (ADVs).

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Vehicles can operate autonomously using driving trajectories. When planning for a driving trajectory, an autonomous vehicle may divide the planning into a path and a speed planning. Speed planning involves a numerical solver. However a numerical solver may fail in corner cases. An emergency stop is one way to handle optimization (e.g., numerical solver) failures. However a large sudden deceleration would cause a sudden jerk, safety on the road, and discomfort to passengers of the ADVs.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

According to some embodiments, when a speed planning optimization fails to generate a speed profile or when an emergency stop is requested by a user/passenger of an ADV through a user intervention, the ADV performs an emergency stop maneuver. In one embodiment, in response to an emergency stop request, a system generates one or more path-time analytical curves, where each of the one or more path-time curves is represented by a polynomial function. The system selects one of the path-time analytical curves to determine whether the selected path-time analytical curve satisfies a set of evaluation criteria. If the selected path-time analytical curve does not satisfy the set of evaluation criteria, the system selects a next one of the path-time analytical curves for evaluation. If the selected path-time analytical curve satisfies the set of evaluation criteria, the system generates a trajectory based on the selected path-time analytical curve to control the ADV during an emergency stop.

Figure 1:
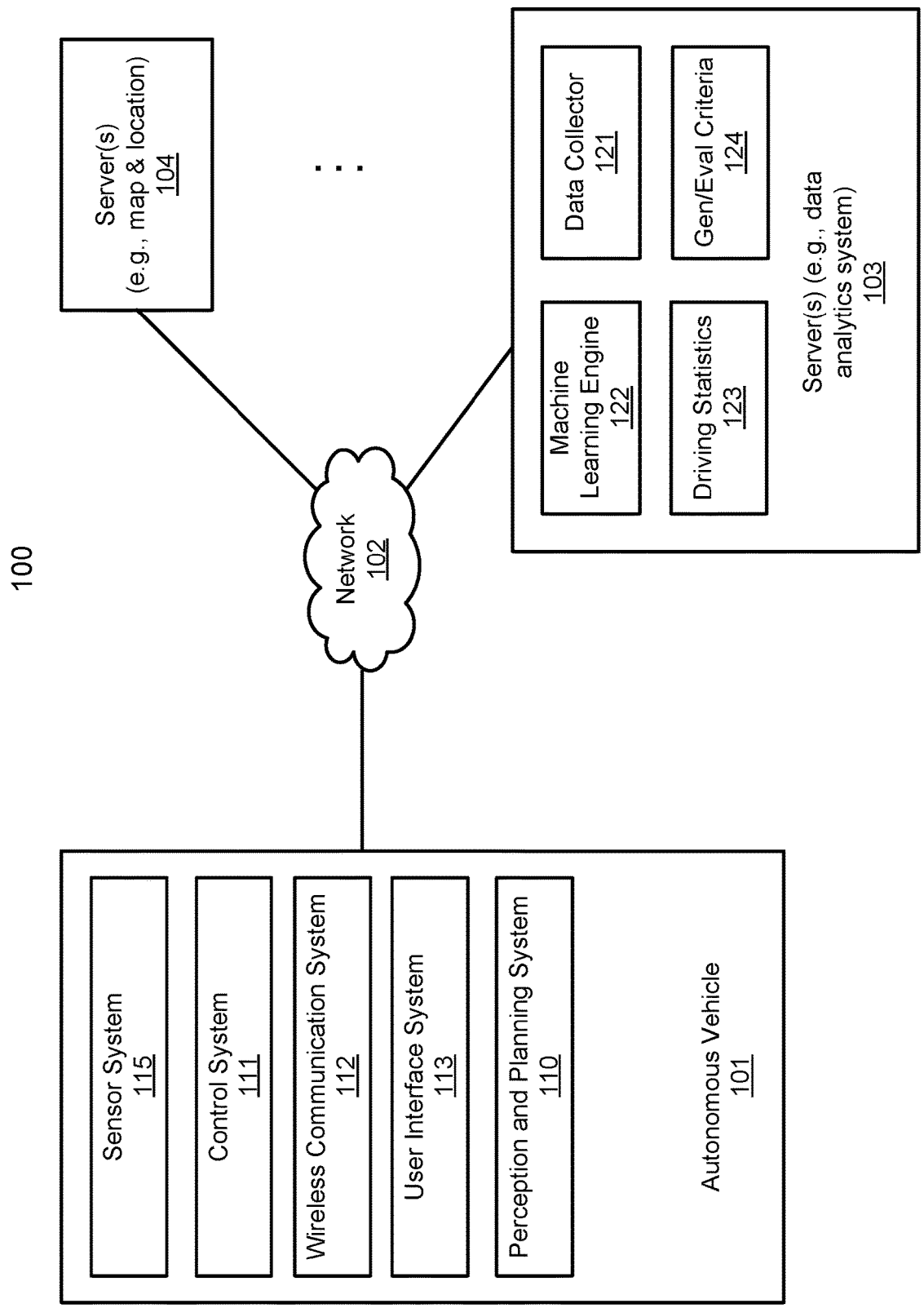
FIG. 1 is a block diagram illustrating a networked system according to one embodiment.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) severs, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
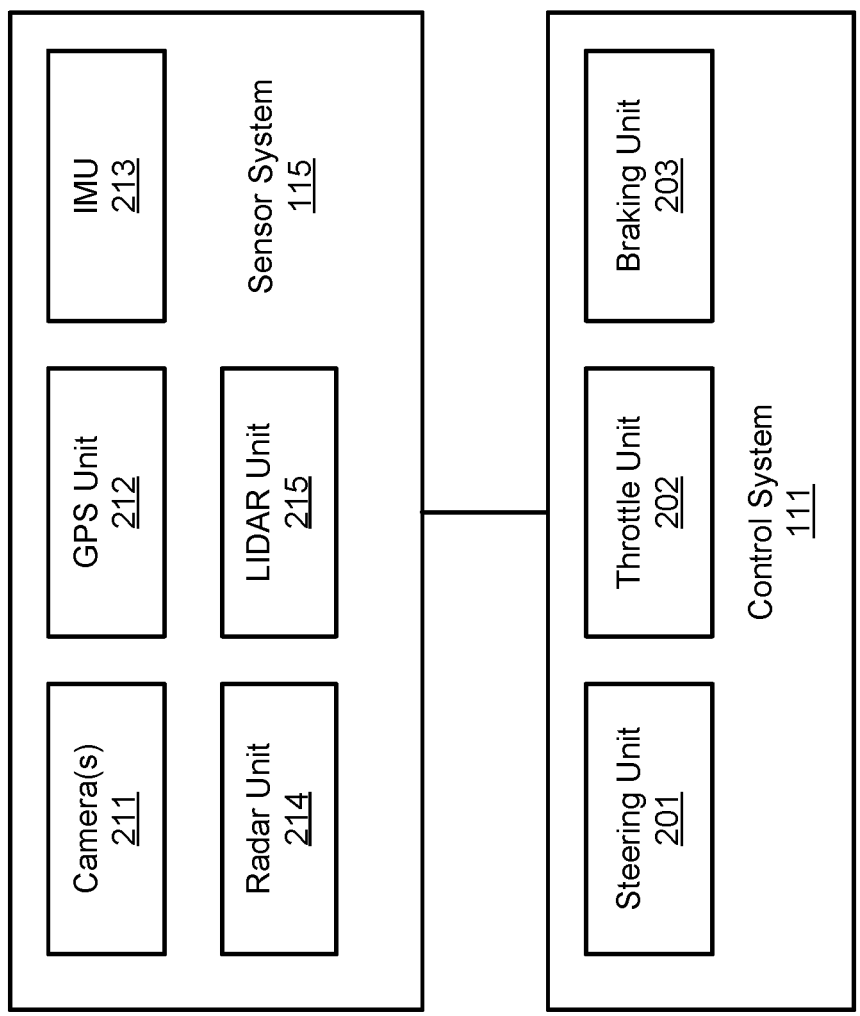
FIG. 2 is a block diagram illustrating an example of a sensor and control system using by an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyword, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time, such as during an emergency stop. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of generation/evaluation criteria

124. For example, in one embodiment, generation criteria, as part of generation/evaluation criteria 124, can include predetermined criteria considered for emergency stops, such as, the ranges of acceptable time intervals to emergency stop under different driving environments (e.g., 1 to 5 second may be acceptable on a 25 mph roadway in a school zone, whereas, 3 to 10 seconds may be acceptable on a 65 mph freeway). Evaluation criteria, as part of generation/evaluation criteria 124, may include evaluation criteria to evaluate a generated analytical speed curve with a high confidence, such as, a threshold number of random time sample evaluations along an analytical curve (e.g., 100 samples or more), and velocity and/or acceleration thresholds.

Figure 3A:
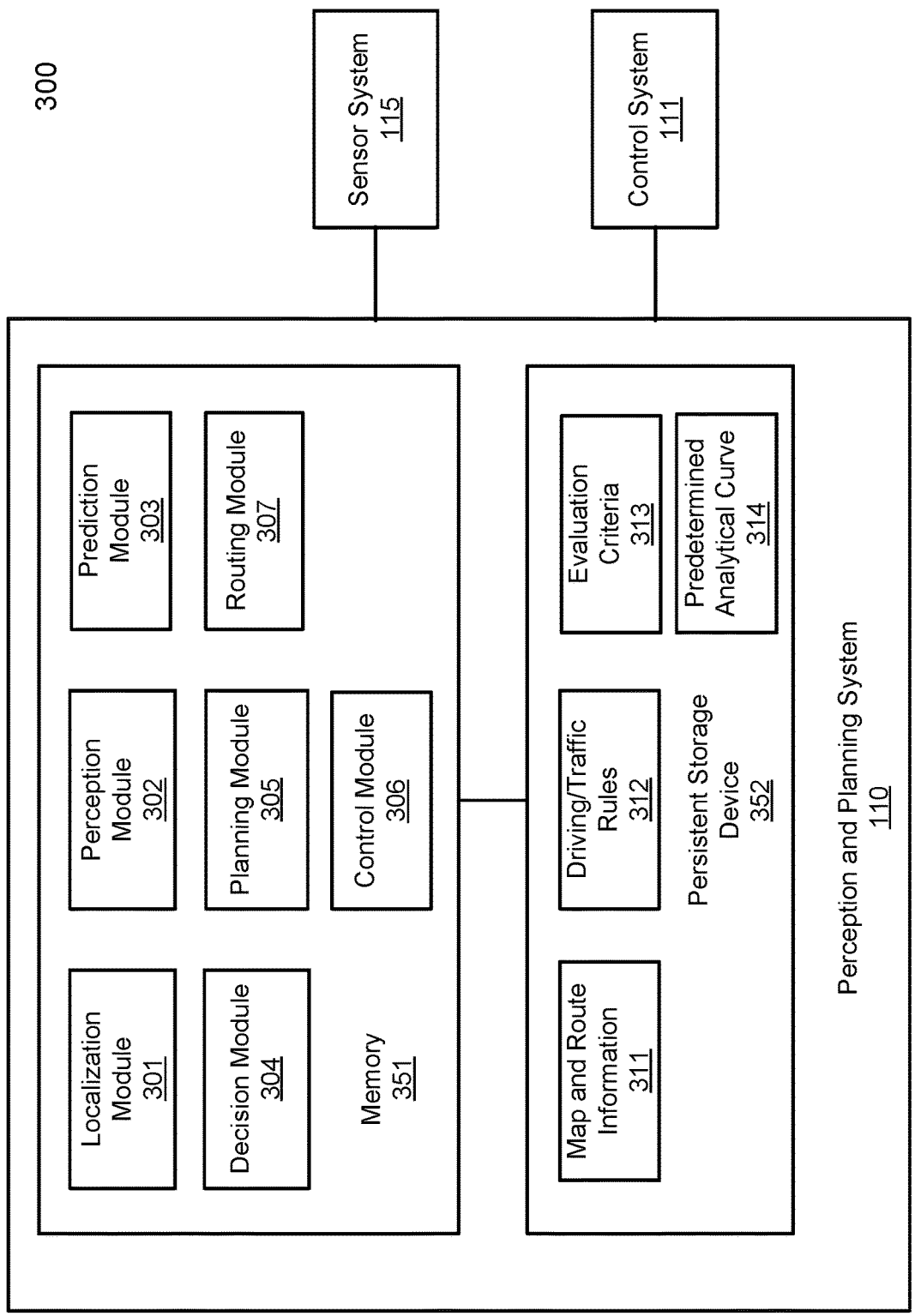
FIGS. 3A-3B are block diagrams illustrating examples of a perception and planning system used by an autonomous vehicle according to some embodiments.
Figure 3B:
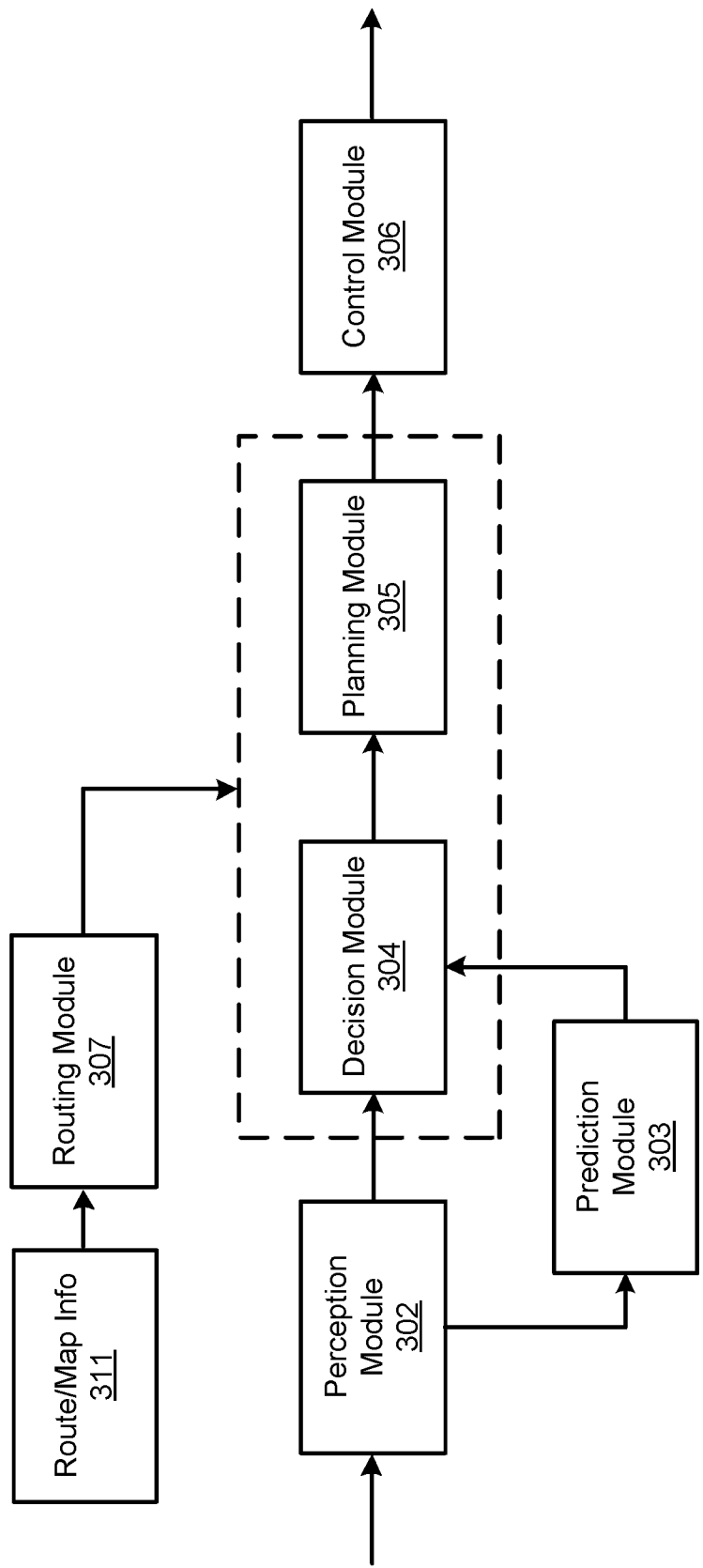

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, and routing module 307.

Some or all of modules 301-307 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-307 may be integrated together as an integrated module. For example, decision module 304 and planning module 305 may be integrated as a single module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration (e.g., straight or curve lanes), traffic light signals, a relative position of another vehicle, a pedestrian, a building, crosswalk, or other traffic related signs (e.g., stop signs, yield signs), etc., for example, in a form of an object.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts how the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Based on a decision for each of the objects perceived, planning module 305 plans a path or route for the autonomous vehicle, as well as driving parameters (e.g., distance, speed, and/or turning angle). That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, and turning commands) at different points in time along the path or route.

In one embodiment, the planning phase is performed in a number of planning cycles, also referred to as command cycles, such as, for example, in every time interval of 100 milliseconds (ms). For each of the planning cycles or command cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to effect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 304/planning module 305 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

Routing module 307 can generate reference lines, for example, from map information such as information of road segments, vehicular lanes of road segments, and distances from lanes to curb. For example, a road can be divided into sections or segments {A, B, and C} to denote three road segments. Three lanes of road segment A can be enumerated {A1, A2, and A3}. A reference line is generated by generating reference points of uniform density along the reference line. For example, for a vehicular lane, routing module 307 can connect midpoints of two opposing curbs or extremities of the vehicular lane provided by a map data. Based on the midpoints and machine learning data representing collected data points of vehicles previously driven on the vehicular lane at different points in time, routing module 307 can calculate the reference points by selecting a subset of the collected data points within a predetermined proximity of the vehicular lane and applying a smoothing function to the midpoints in view of the subset of collected data points.

As described above, route or routing module 307 manages any data related to a trip or route of a user. The user of the ADV specifies a starting and a destination location to obtain trip related data. Trip related data includes route segments and a reference line or reference points of the route segment. For example, based on route map info 311, route module 307 generates a route or road segments table and a reference points table. The reference points are in relations to road segments and/or lanes in the road segments table. The reference points can be interpolated to form one or more reference lines to control the ADV. The reference points can be specific to road segments and/or specific lanes of road segments.

For example, a road segments table can be a name-value pair to include previous and next road lanes for road segments A-D. E.g., a road segments table may be: {(A1, B1), (B1, C1), (C1, D1)} for road segments A-D having lane 1. A reference points table may include reference points in x-y coordinates for road segments lanes, e.g., {(A1, (x1, y1)), (B1, (x2, y2)), (C1, (x3, y3)), (D1, (x4, y4))}, where A1 . . . D1 refers to lane 1 of road segments A-D, and (x1, y1) . . . (x4, y4) are corresponding real world coordinates. Road segments and/or lanes can be divided into a predetermined length such as approximately 200 meters segments/lanes. In another example, road segments and/or lanes can be divided into variable length segments/lanes depending on road conditions such as road curvatures. Each road segment and/or lane can include several reference points. Reference points can be converted to other coordinate systems, e.g., latitude-longitude.

Figure 4:
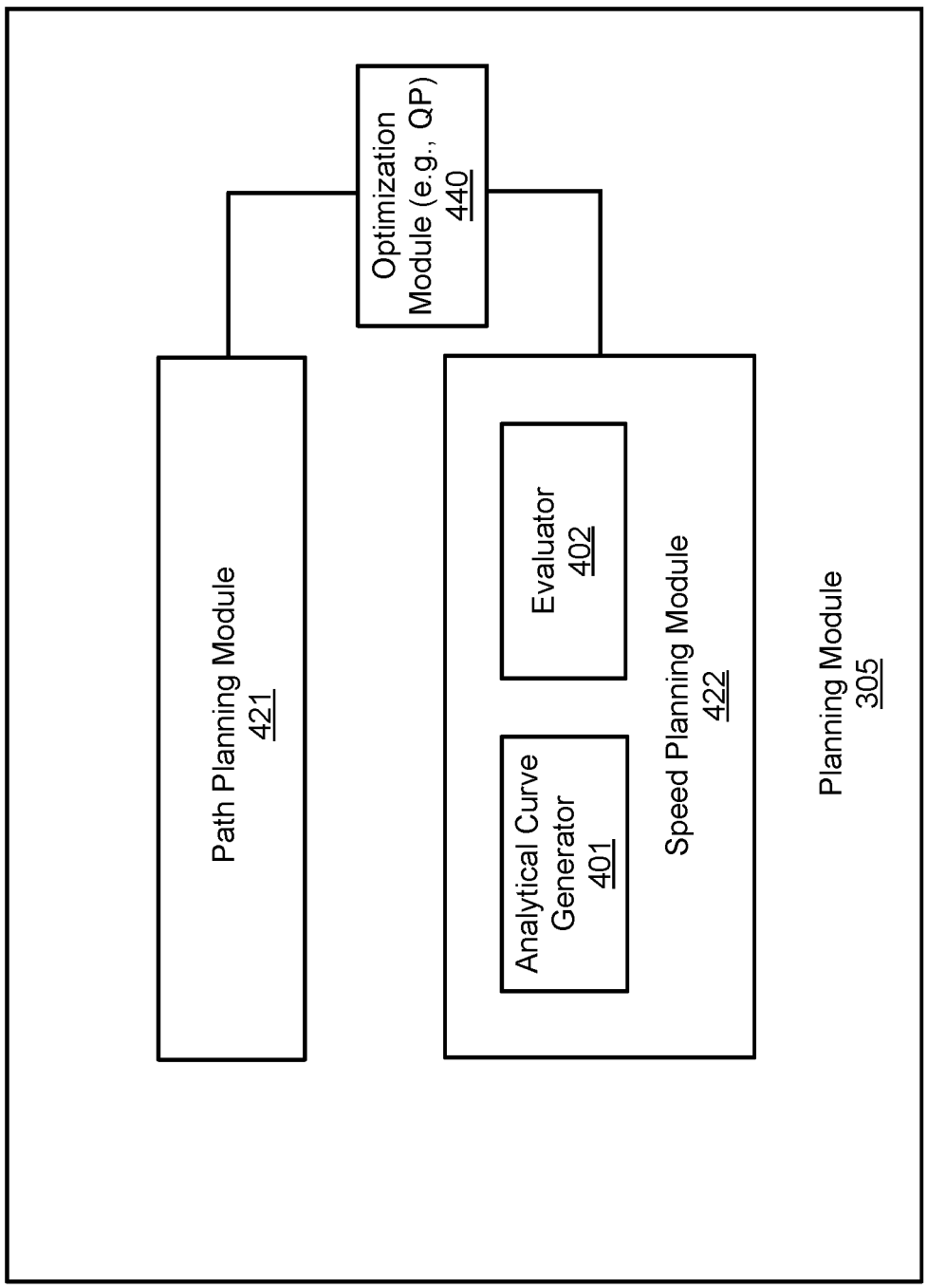
FIG. 4 illustrates a planning module according to one embodiment.

FIG. 4 illustrates an example of a planning module according to one embodiment. Referring to FIG. 4, planning module 305 includes path planning module 421 and speed planning module 422. Decision module 304 of FIG. 3A can generate a rough path profile (e.g., including a station-lateral map) and a rough speed profile (e.g., including a station-time graph) using a reference line. The rough path and speed profiles can be used as initial constraints for planning module 305. Path planning module 421 of planning module 305 can use the rough path profile (e.g., a station-lateral map) to recalculate an optimal path profile using quadratic programming (QP) via optimization module 440. Quadratic programming involves minimizing or maximizing an objective function (e.g., a quadratic function with several variables) subject to bounds, linear equality, and inequality constraints. Speed planning module 422 can use a rough speed profile (e.g., a station-time graph) and the optimized path profile to recalculate an optimal speed profile using QP via optimization module 440.

Speed planning module 422 includes analytical curve generator 401 and analytical curve evaluator 402. Analytic curve generator 401 can generate one or more analytic speed curves (e.g., analytical speed curve for a speed profile instead of an optimized speed profile) as the final speed profile for the ADV to perform an emergency stop maneuver. Analytic curve evaluator 402 can evaluate a speed curve for a high confidence.

For example, often times, while an optimal speed profile is being calculated by speed planning module 422, the optimization can fail. Upon a detection of a failure, the first analytic speed curve with a high confidence can be the final speed profile for the emergency stop maneuver.

Figure 5:
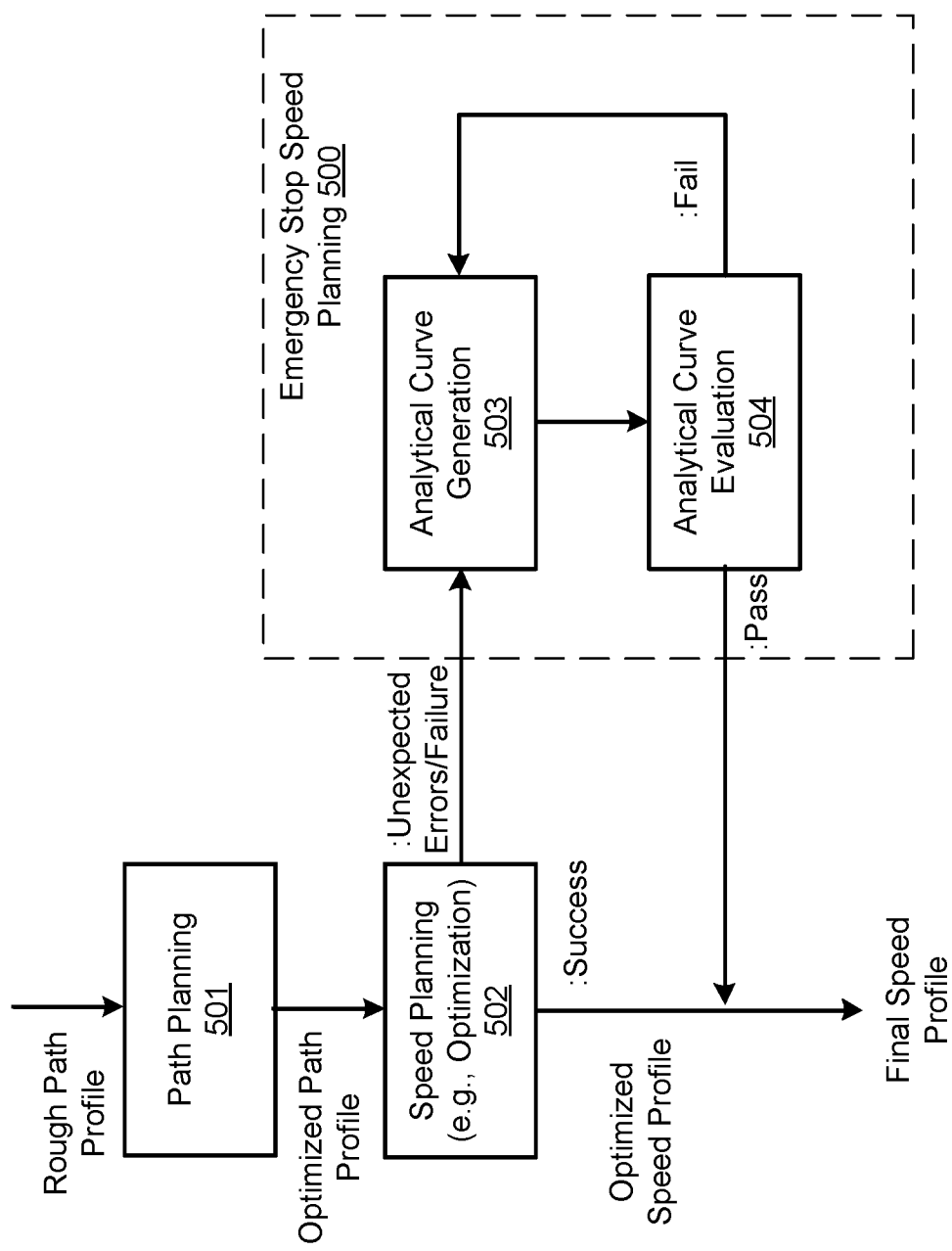
FIG. 5 is a flow chart illustrating an emergency stop speed planning according to one embodiment.

FIG. 5 is a flow chart illustrating an emergency stop speed planning process according to one embodiment. Emergency stop speed planning process 500 can be performed by planning module 305 of FIG. 3A in the event of an emergency stop caused by speed optimization failures (e.g., detection of an optimization failure for speed planning module 422) or as requested by a user/passenger of an ADV. Referring to FIG. 5, a trajectory planning includes path planning 501 and speed planning 502. Emergency stop speed planning process 500 includes the additional analytical curve generation 503 and analytical curve evaluation 504 modules to generate/evaluate analytical speed curves. For example, path planning 501 receives a rough path profile as an initial constraint to generate an optimized path profile as the output. Speed planning 502 receives the optimized path profile (along with a rough speed profile) and generates an optimized speed profile using an optimization method, such as a QP solver. If unexpected errors and/or failures occurs (or an emergency stop requested by a passenger of the ADV), instead of applying a constant deceleration to the ADV for an emergency stop, speed planning 502 continues to analytical curve generation 503 to generate an analytic speed curve, e.g., one at a time or a set at a time. Evaluation 504 evaluates the analytic speed curve for a high confidence as they are generated using a set of evaluation criteria (as part of Evaluation criteria 313 of FIG. 3A). If the analytic speed curve fails any of the evaluation criteria, process 500 continues to analytical curve generation 503 to generate again an analytic speed curve (or a set at a time). Evaluation 504 evaluates the generated analytic speed curve for a high confidence. The first analytic speed curve that passes the set of evaluation criteria with a high confidence would be the final speed profile for the emergency stop.

The set of evaluation criteria may include a number of iterations of random time samples along an analytic curve is evaluated for a high confidence, the range of acceptable acceleration (e.g., acceptable acceleration at all times of the speed curve), and a threshold of acceptable velocity (e.g., velocity at all times of the speed curve). For example, in one embodiment, evaluation criteria can include a number of iterations of random time samples to be 100 iterations for a high confidence, an acceleration range of (−4 to 3) m/s$^2$, and a velocity threshold greater than or equal to 0 m/s. In this case, analytical curve evaluator 402 selects an evaluation point at a random time along the path-time analytical curve. Evaluator 402 then calculates an acceleration and a velocity at the selected evaluation point and determines whether the calculated acceleration is within a threshold boundary of (−4 to 3) m/s$^2$ and whether the calculated velocity is above 0 m/s. These evaluation steps are repeated for the minimum iteration threshold of 100 times before the analytic curve is deemed a passing analytic curve with a high confidence.

Figure 6:
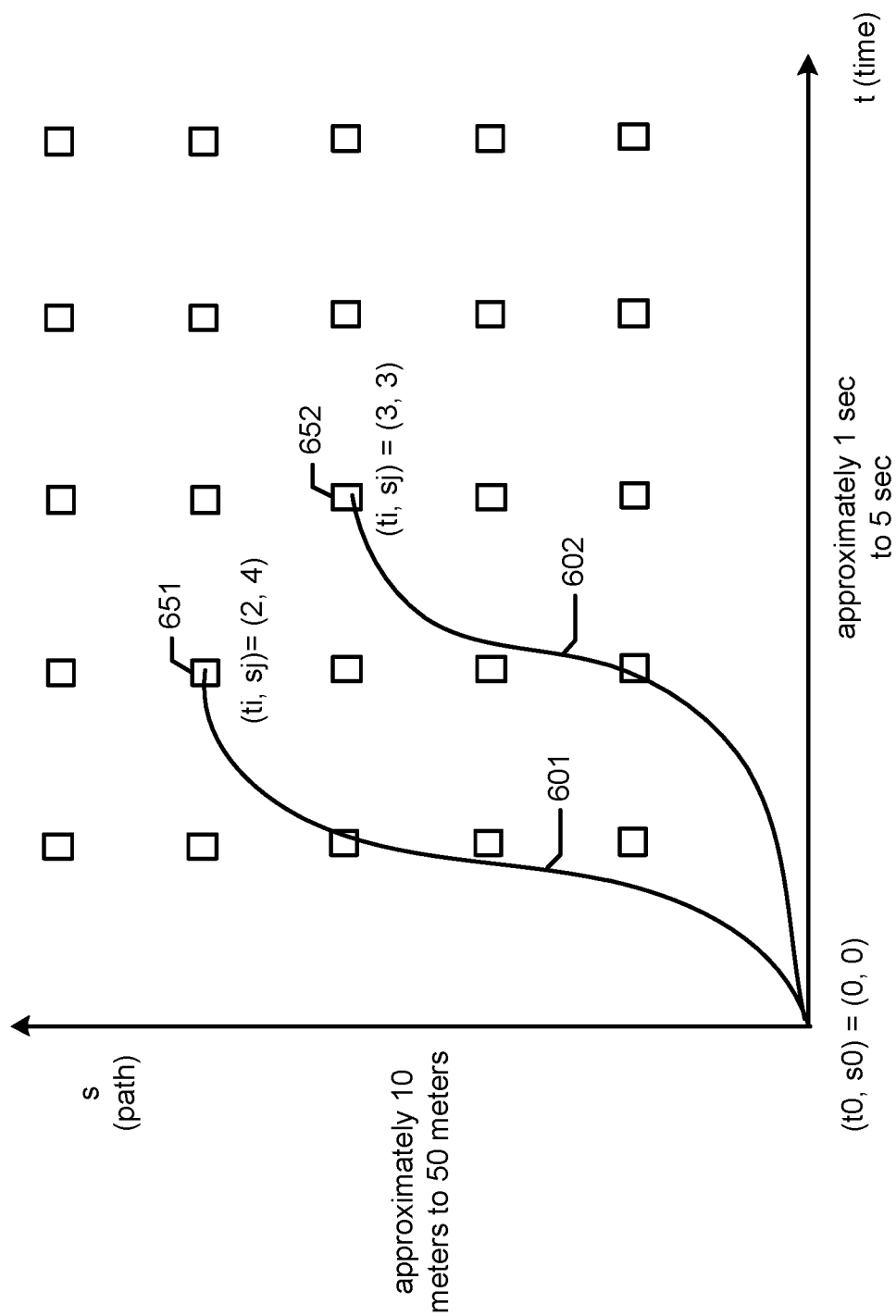
FIG. 6 is a ST graph illustrating examples of generated analytical speed curves according to some embodiment.

FIG. 6 is a ST graph illustrating examples of generated analytical speed curves according to some embodiments. Analytical speed curves can be generated by analytic curve generator 401 of FIG. 4. Referring to FIG. 6, an ST graph is a station-time graph or a graph plotting distance versus time along a particular path (e.g., a path profile) of an ADV. The (t, s)=(0, 0) coordinate can represent an initial time and an initial station of an ADV. In one embodiment, an ADV is provided some generation criteria by generation criteria 124 of FIG. 1, such as acceptable time intervals and/or distances to emergency stop (e.g., 1 to 5 seconds, and 10 to 50 meters). Based on these generation criteria, analytical speed curve generator generates one or more analytic speed curves. For example, generator 401 may step through the acceptable time intervals/distances, such as 1 through 5 seconds in 500 millisecond increments, and 10 through 50 meters in 5 meter increments, to generate a number of acceptable time-distance pairs (such as 651-652) for an emergency stop. For each of the time-distance pairs, an analytic curve is generated (such as 601-602) while satisfying initial and end boundary constraints/conditions. The analytic curves 601-602 can be represented by a quartic or a quintic polynomial function. An analytic curve is selected if a predetermined set of constraints are satisfied.

In one embodiment, a quintic polynomial function can be defined as $$g(x)=ax^5+bx^4+cx^3+dx^2+ex+f$$

where a, b, c, d, e and f are members of a field, typically the rational numbers, the real numbers or the complex numbers, and a is nonzero. In other words, a quintic function is defined by a polynomial of degree five.

In one embodiment, a quartic polynomial function can be defined as $$f(x)=ax^4+bx^3+cx^2+dx+e$$

where a is nonzero, which is defined by a polynomial of degree four.

For the constraints, for example, at $(t, s)=(t_0, s_0)$, where $t_0$ and $s_0$ are current time and current station respectively for an ADV, initial boundary constraints can include $ds/dt|t_0$=initial velocity, and $d^2s/dt^2|t_0$=initial acceleration of the ADV. End boundary constraints can include velocity=$ds/dt|(t_0+t_i)$=0, and acceleration=$d^2s/dt^2|(t_0+t_i)$=0, where $t_0+t_i$ is the time value for an end, or emergency stopped, position of the ADV.

Figure 7:
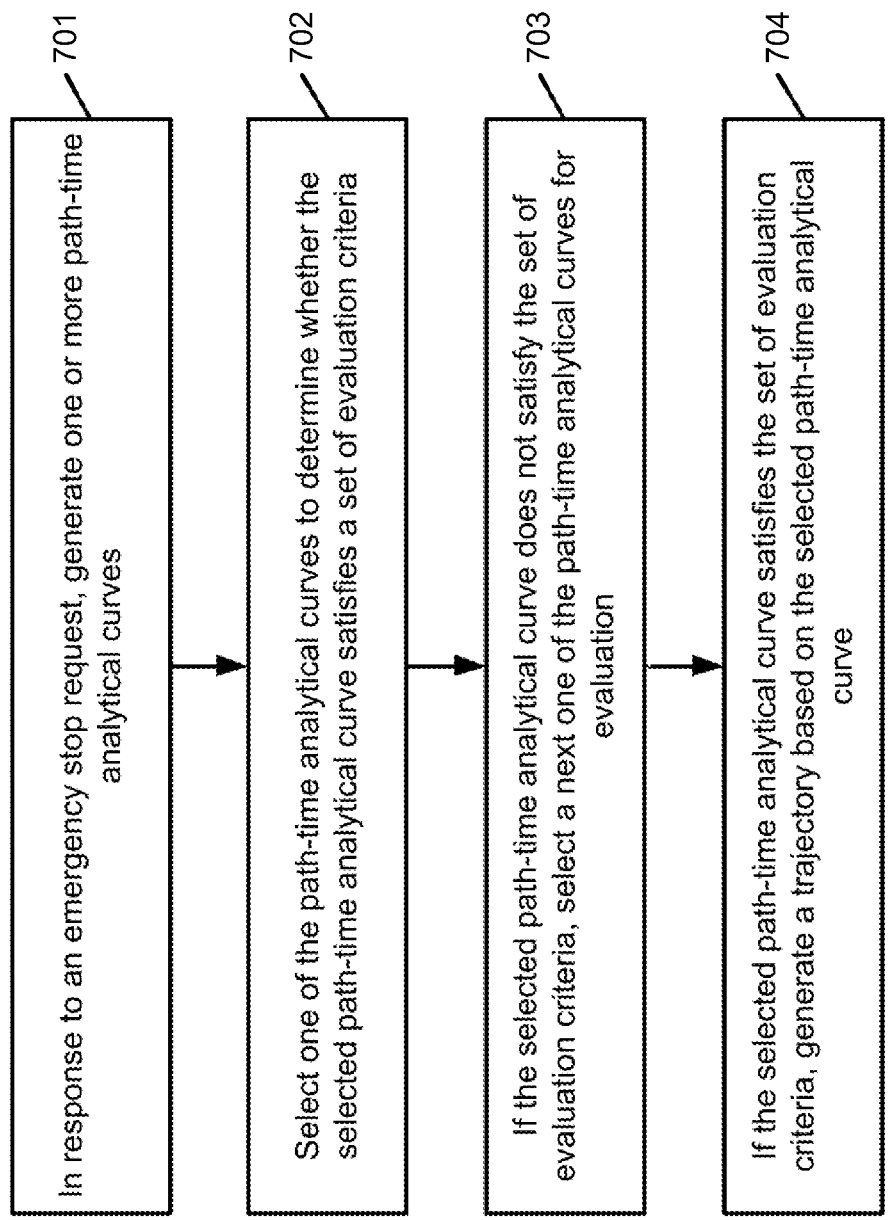
FIG. 7 is a flow diagram illustrating a method for emergency stop speed planning according to one embodiment.

FIG. 7 is a flow diagram illustrating a method for emergency stop speed planning according to one embodiment. Processing 700 may be performed by processing logic which may include software, hardware, or a combination thereof. For example, process 700 may be performed by speed planning module 422 of FIG. 4. Referring to FIG. 7, at block 701, in response to an emergency stop request, processing logic generates one or more path-time analytical curves (e.g., analytical speed curves), where each of the analytical speed curves may be a polynomial function. At block 702, processing logic selects one of the path-time analytical curves to determine whether the selected path-time analytical curve satisfies a set of evaluation criteria. At block 703, if the selected path-time analytical curve does not satisfy the evaluation criteria, processing logic selects a next one of the path-time analytical curves for evaluation. At block 704, if the selected path-time analytical curve satisfies the evaluation criteria, processing logic generates a trajectory based on the selected path-time analytical curve, where the trajectory is used to control the ADV during an emergency stop. Otherwise, the above operations are iteratively performed until an analytic curve that satisfies the set of constraints has been found.

Figure 8:
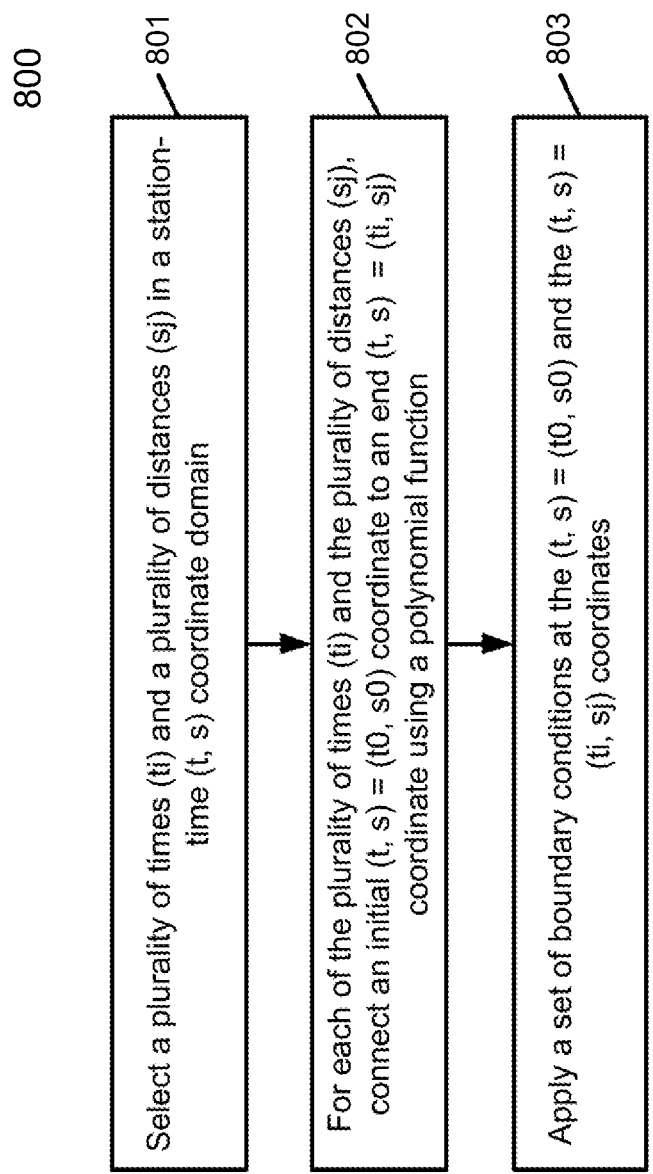
FIG. 8 is a flow diagram illustrating a method for analytical speed curve generation according to one embodiment.

FIG. 8 is a flow diagram illustrating a method for analytical speed curve generation according to one embodiment. Processing 800 may be performed by processing logic which may include software, hardware, or a combination thereof. For example, process 800 may be performed by analytical curve generator 401 of FIG. 4, for example, as a part of operations involved in operation 701 of FIG. 7. Referring to FIG. 8, at block 801, processing logic selects a plurality of times $(t_i)$ and a plurality of distances $(s_j)$ in a station-time (t, s) coordinate domain. At block 802, for each of the plurality of times $(t_i)$ and for each of the plurality of distances $(s_j)$, processing logic connects an initial $(t, s)=(t_0, s_0)$ coordinate to an end $(t, s)=(t_i, s_j)$ coordinate using a polynomial function. At block 803, processing logic applies a set of boundary conditions at the (t, s)=($t_0$, $s_0$) and the (t, s)=($t_i$, $s_j$) coordinates.

Figure 9:
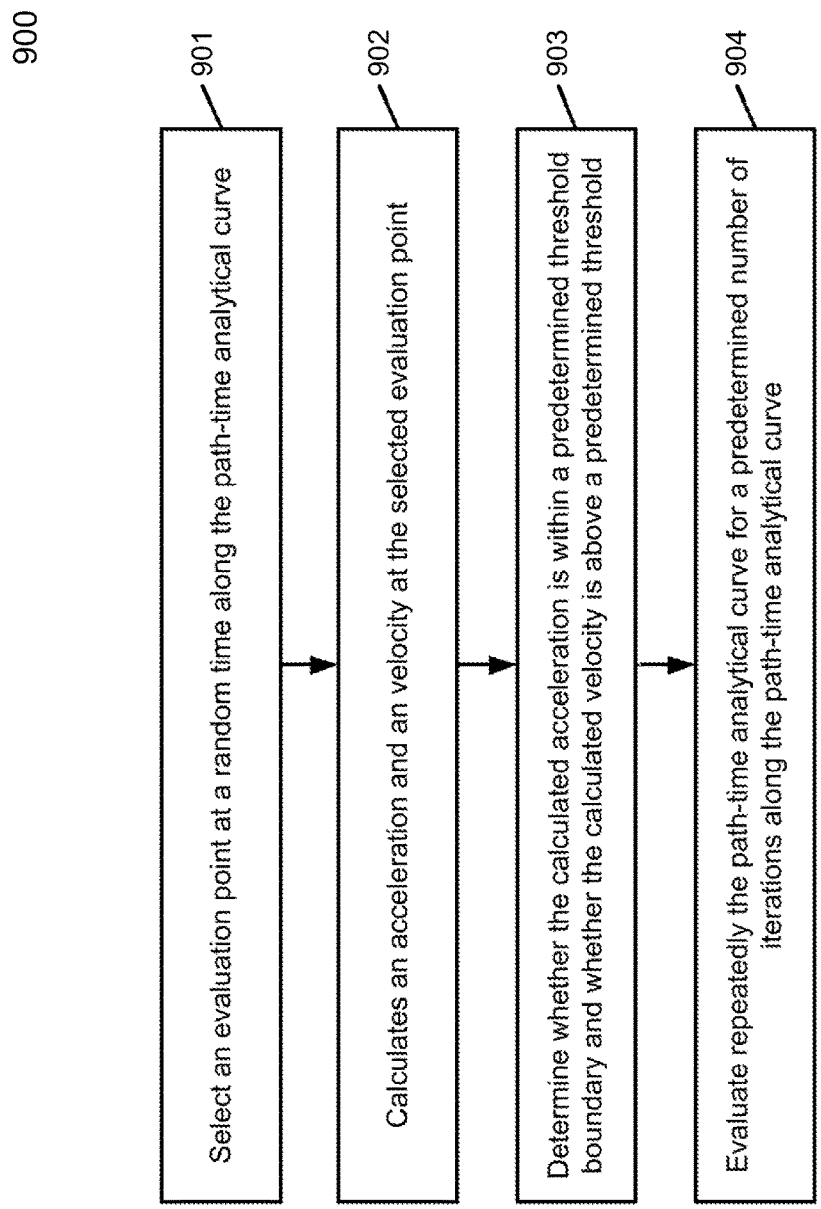
FIG. 9 is a flow diagram illustrating a method for analytical speed curve evaluation according to one embodiment.

FIG. 9 is a flow diagram illustrating a method for analytical speed curve evaluation for confidence level according to one embodiment. Processing 900 may be performed by processing logic which may include software, hardware, or a combination thereof. For example, process 900 may be performed by analytical curve evaluator 402 of FIG. 4, for example, as a part of operations involved in operation 702 of FIG. 7. Referring to FIG. 9, at block 901, processing logic selects an evaluation point at a random time along the path-time analytical curve. At block 902, processing logic calculates an acceleration and an velocity at the selected evaluation point. At block 903, processing logic determines whether the acceleration is within a predetermined threshold boundary and whether the velocity is above a predetermined threshold. At block 904, processing logic evaluates repeatedly the path-time analytical curve for a predetermined number of iterations along the path-time analytical curve.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 10:
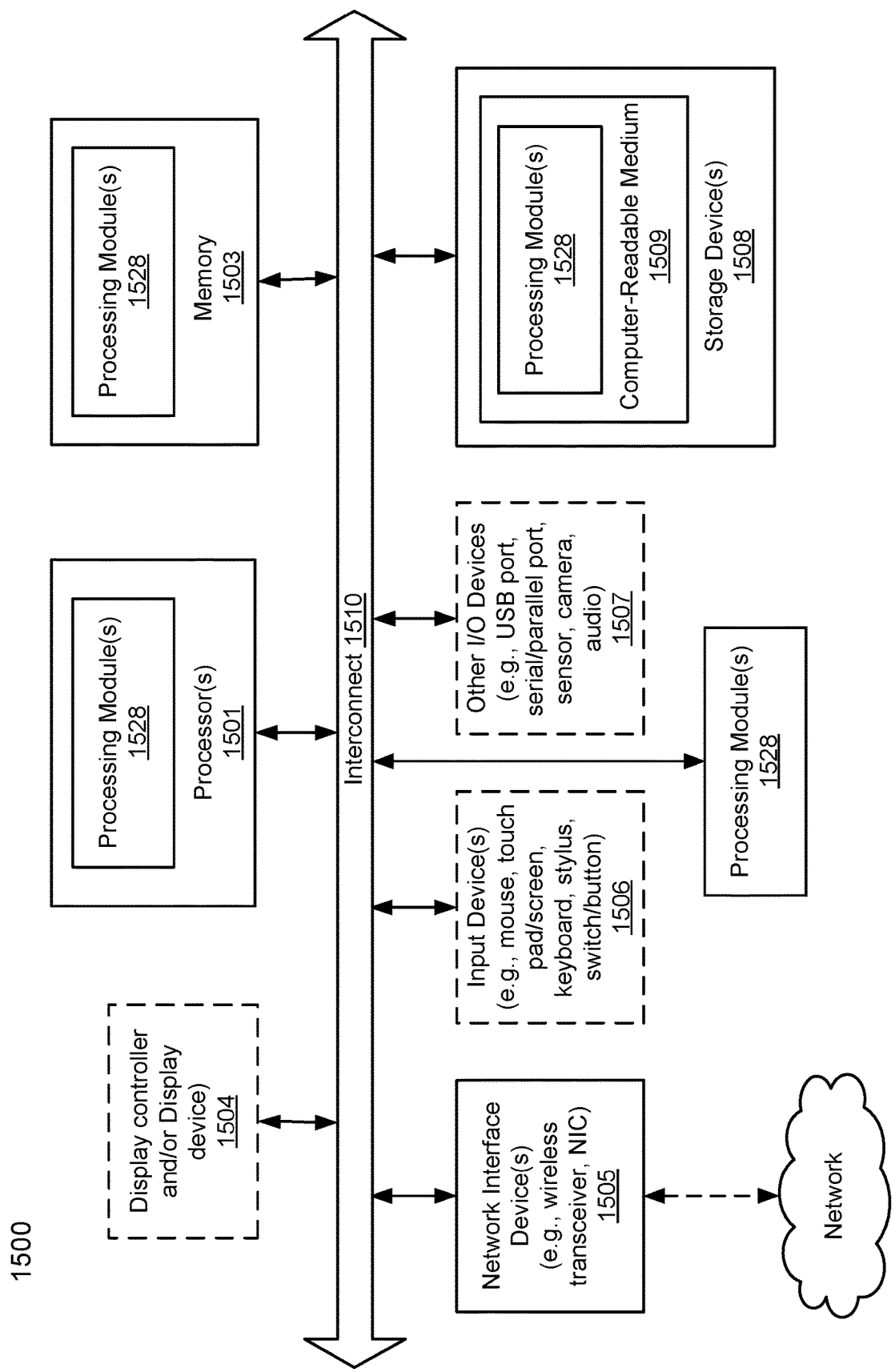
FIG. 10 is a block diagram illustrating a data processing system according to one embodiment.

FIG. 10 is a block diagram illustrating an example of a data processing system which may be used with one embodiment of the disclosure. For example, system 1500 may represent any of data processing systems described above performing any of the processes or methods described above, such as, for example, speed planning module 422 of FIG. 4. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS®/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional 10 device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, analytical curve generator 401 and analytical curve evaluator 402 of FIG. 4. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method to generate an emergency stop trajectory for an autonomous driving vehicle (ADV), the method comprising:
   in response to a user-initiated emergency stop request or a speed optimization failure, generating two or more path-time analytical curves for performing an ADV emergency stop, wherein each of the two or more path-time analytical curves is represented by a polynomial function;
   selecting one of the path-time analytical curves to determine whether the selected path-time analytical curve satisfies a set of evaluation criteria, wherein the set of evaluation criteria include determining whether acceleration is within an acceptable acceleration range and velocity is within an acceptable velocity range at each of a predetermined number of randomly sampled evaluation points along the selected path-time analytical curve;
   if the selected path-time analytical curve does not satisfy the set of evaluation criteria, selecting a next one of the path-time analytical curves for evaluation;
   for a selected path-time analytical curve that satisfies the set of evaluation criteria, generating a trajectory based on the selected path-time analytical curve; and
   controlling the ADV to an emergency stop using the trajectory.

2. The computer-implemented method of claim 1, wherein generating the two or more path-time analytical curves includes:
   selecting a plurality of times ($t_i$) and a plurality of distances ($s_j$) in a station-time (t, s) coordinate domain,
   for each of the plurality of times ($t_i$) and for each of the plurality of distances ($s_j$)
      connecting an initial (t, s)=($t_0$, $s_0$) coordinate to (t, s)=($t_i$, $s_j$) coordinate using the polynomial function to generate one path-time analytical curve; and
      applying a set of boundary conditions to the (t, s)=($t_0$, $s_0$) and the (t, s)=($t_i$, $s_j$) coordinates.

3. The computer-implemented method of claim 2, wherein the set of boundary conditions at initial (t, s)=($t_0$, $s_0$) coordinate includes t=$t_0$=0, ds/dt|$t_0$=initial velocity of the ADV, and $d^2s/dt^2$|$t_0$=initial acceleration of the ADV.

4. The computer-implemented method of claim 2, wherein the set of boundary conditions at (t, s)=($t_i$, $s_j$) coordinate includes ds/dt|$t_0+t_i$=0, and $d^2s/dt^2$|$t_0+t_i$=0.

5. The computer-implemented method of claim 2, wherein the plurality of distances ($s_j$) and the plurality of times ($t_i$) for generating the two or more path-time analytical curves are within a predetermined distance and a predetermined time interval, respectively, to emergency stop the ADV.

6. The computer-implemented method of claim 1, wherein the two or more path-time analytical curves includes one or more quartic or quintic polynomial functions.

7. The computer-implemented method of claim 1, wherein the emergency stop is requested upon observation of an abnormal behavior or detection of an optimization failure during speed planning.

8. The computer-implemented method of claim 4-7, wherein the speeding planning utilizes the selected path-time analytical curve that satisfies the evaluation criteria instead of an optimized speed profile.

9. The computer-implemented method of claim 8, wherein determining whether the selected path-time analytical curve satisfies the evaluation criteria further comprises evaluating repeatedly the path-time analytical curve for a predetermined number of iterations along the selected path-time analytical curve.

10. A non-transitory machine-readable medium having instructions stored therein, which when executed by one or more processors, cause the one or more processors to perform operations, the operations comprising:
    in response to a user-initiated emergency stop request or a speed optimization failure, generating two or more path-time analytical curves for performing an ADV emergency stop, wherein each of the two or more path-time analytical curves is represented by a polynomial function;
    selecting one of the path-time analytical curves to determine whether the selected path-time analytical curve satisfies a set of evaluation criteria, wherein the set of evaluation criteria include determining whether acceleration is within an acceptable acceleration range and velocity is within an acceptable velocity range at each of a predetermined number of randomly sampled evaluation points along the selected path-time analytical curve;
    if the selected path-time analytical curve does not satisfy the set of evaluation criteria, selecting a next one of the path-time analytical curves for evaluation;
    for a selected path-time analytical curve that satisfies the set of evaluation criteria, generating a trajectory based on the selected path-time analytical curve; and
    controlling the ADV to an emergency stop using the trajectory.

11. The machine-readable medium of claim 10, wherein generating the two or more path-time analytical curves comprises:
    selecting a plurality of times ($t_i$) and a plurality of distances ($s_j$) in a station-time (t, s) coordinate domain,
    for each of the plurality of times ($t_i$) and for each of the plurality of distances ($s_j$)
       connecting an initial (t, s)=($t_0$, $s_0$) coordinate to (t, s)=($t_i$, $s_j$) coordinate using the polynomial function to generate one path-time analytical curve; and applying a set of boundary conditions to the $(t, s)=(t_0, s_0)$ and the $(t, s)=(t_i, s_j)$ coordinates.

12. The machine-readable medium of claim 11, wherein the set of boundary conditions at initial $(t, s)=(t_0, s_0)$ coordinate includes $t=t_0=0$, $ds/dt|t_0=$initial velocity of the ADV, and $d^2s/dt^2|t_0=$initial acceleration of the ADV.

13. The machine-readable medium of claim 11, wherein the set of boundary conditions at $(t, s)=(t_i, s_j)$ coordinate includes $ds/dt|t_0+t_i=0$, and $d^2s/dt^2|t_0+t_i=0$.

14. The machine-readable medium of claim 11, wherein the plurality of distances $(s_j)$ and the plurality of times $(t_i)$ for generating the two or more path-time analytical curves are within a predetermined distance and a predetermined time period, respectively, to emergency stop the ADV.

15. The machine-readable medium of claim 10, wherein the two or more path-time analytical curves includes one or more quartic or quintic polynomial functions.

16. A data processing system, comprising:
one or more processors; and
a memory coupled to the one or more processors to store instructions, which when executed by the one or more processors, cause the one or more processors to perform operations, the operations including
in response to a user-initiated emergency stop request or a speed optimization failure, generating two or more path-time analytical curves for performing an ADV emergency stop, wherein each of the two or more path-time curves is represented by a polynomial function;
selecting one of the path-time analytical curves to determine whether the selected path-time analytical curve satisfies a set of evaluation criteria, wherein the set of evaluation criteria include determining whether acceleration is within an acceptable acceleration range and velocity is within an acceptable velocity range at each of a predetermined number of randomly sampled evaluation points along the selected path-time analytical curve;
if the selected path-time analytical curve does not satisfy the set of evaluation criteria, selecting a next one of the path-time analytical curves for evaluation;
for a selected path-time analytical curve that satisfies the set of evaluation criteria, generating a trajectory based on the selected path-time analytical curve; and
controlling the ADV to an emergency stop using the trajectory.

17. The system of claim 16, wherein generating the two or more path-time analytical curves includes:
selecting a plurality of times $(t_i)$ and a plurality of distances $(s_j)$ in a station-time $(t, s)$ coordinate domain,
for each of the plurality of times $(t_i)$ and for each of the plurality of distances $(s_j)$
connecting an initial $(t, s)=(t_0, s_0)$ coordinate to $(t, s)=(t_i, s_j)$ coordinate using the polynomial function to generate one path-time analytical curve; and
applying a set of boundary conditions to the $(t, s)=(t_0, s_0)$ and the $(t, s)=(t_i, s_j)$ coordinates.

18. The system of claim 17, wherein the set of boundary conditions at initial $(t, s)=(t_0, s_0)$ coordinate includes $t=t_0=0$, $ds/dt|t_0=$initial velocity of the ADV, and $d^2s/dt^2|t_0=$initial acceleration of the ADV.

19. The system of claim 17, wherein the set of boundary conditions at $(t, s)=s_j)$ coordinate includes $ds/dt|t_0+t_i=0$, and $d^2s/dt^2|t_0+t_i=0$.

20. The system of claim 17, wherein the plurality of distances $(s_j)$ and the plurality of times $(t_i)$ for generating the two or more path-time analytical curves are within a predetermined distance and a predetermined time period, respectively, to emergency stop the ADV.

21. The system of claim 16, wherein the two or more path-time analytical curves includes one or more quartic or quintic polynomial functions.

* * * * *